United States Patent [19]
Grace et al.

[11] Patent Number: 6,149,985
[45] Date of Patent: Nov. 21, 2000

[54] HIGH-EFFICIENCY PLASMA TREATMENT OF IMAGING SUPPORTS

[75] Inventors: Jeremy M. Grace, Rochester; Louis J. Gerenser, Webster, both of N.Y.

[73] Assignee: Eastman Kodak Company, Rochester, N.Y.

[21] Appl. No.: 09/349,288

[22] Filed: Jul. 7, 1999

[51] Int. Cl.[7] .................................................. C23C 16/00
[52] U.S. Cl. ...................... 427/536; 427/569; 118/723 E
[58] Field of Search ....................... 118/723 E; 427/536, 427/569

[56] References Cited

U.S. PATENT DOCUMENTS

| | | |
|---|---|---|
| 3,288,638 | 11/1966 | Van Paassen et al. . |
| 3,309,299 | 3/1967 | Mantell . |
| 4,429,032 | 1/1984 | Matthe et al. . |
| 4,451,497 | 5/1984 | Dolezalek et al. . |
| 5,224,441 | 7/1993 | Felts et al. . |
| 5,324,414 | 6/1994 | Spahn et al. . |
| 5,493,117 | 2/1996 | Tamaki et al. . |
| 5,538,841 | 7/1996 | Grace et al. . |
| 5,563,029 | 10/1996 | Grace et al. . |
| 5,576,164 | 11/1996 | Grace et al. . |
| 5,618,659 | 4/1997 | Grace et al. . |

FOREIGN PATENT DOCUMENTS

| | | |
|---|---|---|
| 0 758 687 A1 | 2/1997 | European Pat. Off. . |
| WO 97/42257 | 11/1997 | WIPO . |

OTHER PUBLICATIONS

Surfaces & Coating Technology 93 1997 pp. 261–264, Polymer surface modification by plasma source ion implantation, by Seunghee Han, Yeonhee Lee, Haidong Kim, Gon–ho Kim, Junghey Lee, Jung–Hyeon Yoon, Gunwoo Kim.

Rarefied Gas Dynamics: Experimental Techniques and Physical Systems, vol. 158 Progress in Astronautics and Aeronautics "Materials Processing in Dual–Mode Microwave/Radiofrequency Plasmas" by J.E. KLemberg–Sapieha et al.

Glow Discharge Processes, Brian Chapman, John Wiley & Sons, 1980 pp. 52–71, 80–81, 112–113, 156–169.

Dual–Frequency N2 and NH3 Plasma Modification of Polyethylane and Polyimide by JE Klemberg–Sapieha et al, J Vac Sci Technol A 9 (6) Nov./Dec. 1991 pp 2975–2981.

*Primary Examiner*—Richard Bueker
*Attorney, Agent, or Firm*—Mark G. Bocchetti

[57] ABSTRACT

A method and apparatus are taught for treating polymer webs for obtaining the proper surface characteristics to promote adhesion of photosensitive coating materials and/or layers typically coated thereon. The web is passed through a high-voltage sheath region or dark space of the plasma generated by a powered electrode residing in a discharge zone. The frequency of the driving voltage must be above a lower bound dictated by the properties of the polymer support and the plasma, and it must be below an upper bound beyond which the sheath voltages drop significantly and it is observed that the benefits of this approach diminish. The dark space is generated by a treatment electrode in a treatment zone. There is a counter electrode having a surface area in said treatment zone which is at least as great as the surface area of the treatment electrode. A power supply is included for driving the treatment electrode with an oscillating high voltage at a frequency less than about 2 MHz and greater than $1/t_c$ where $t_c$ is the charging time of a web surface exposed to a rms ion current in the plasma.

25 Claims, 9 Drawing Sheets

HIGH-EFFICIENCY PLASMA TREATMENT OF IMAGING SUPPORTS

FIELD OF THE INVENTION

This invention relates generally to the manufacture of imaging supports and polymeric support materials and, more particularly, to a method and apparatus for obtaining the proper surface characteristics to promote adhesion of photosensitive coating materials and/or layers typically coated thereon.

BACKGROUND OF THE INVENTION

Electrical discharge treatments are widely used to promote adhesion of a variety of organic and inorganic layers to organic polymer substrates. Examples of the use of electrical discharge treatments are found in U.S. Pat. No. 5,538,841 and references cited therein. Additional examples are found in European Pat. Application EP 0 758 687 A1 and references cited therein, as well as well as World Pat. WO 97/42257. A variety of treatment geometries (i.e. positioning of the article to be treated relative to the discharge electrodes, shape of the electrodes, and shape of the article to be treated) are possible (see, for example U.S. Pat. Nos. 3,288,638 and 3,309,299) the need to treat continuous sheets or rolls of polymeric support material (i.e., webs) has generally led to treatment apparatus design for the purposes of conveying a web through an electrical discharge zone. This purpose has been achieved either by suspending the polymer article in a free span between conveyance rollers, as disclosed in U.S. Pat. No. 5,493,117 or on a drum, as disclosed in U.S. Pat. No. 4,451,497 and U.S. Pat. No. 5,224,441. In U.S. Pat. Nos. 4,451,497 and 5,493,117, as well as in U.S. Pat. No. 5,538,841, an objective of the invention is to provide surface treatments for use in the manufacture of photographic imaging elements on polyester supports. Dolazalek et al (U.S. Pat. No. 4,451,497) disclose an apparatus for conveying a polymer web material into a vacuum chamber, through a treatment zone and out of the vacuum chamber. The treatment configuration shown and discussed is essentially a corona treatment geometry wherein the web travels along a rotating drum that is surrounded by a plurality of discharge electrodes. The objective is to prepare a substrate to be coated with photographic emulsion. Tamaki et al. (U.S. Pat. No. 5,493,117) disclose an apparatus similar to that of Dolazalek et al. having the similar purpose of providing a support useable for a photosensitive material. In their treatment zone, however, Tamaki et al. suspend the web in free span between conveyance rollers and have a plurality of treatment electrodes located on either side of the free span in order to treat both sides of the web simultaneously. Felts et al (U.S. Pat. No. 5,224,441) disclose a plasma treatment and coating apparatus wherein the web is conveyed over the surface of an electrified drum, facing a grounded counter electrode. Grace et al. (U.S. Pat. No. 5,538,841) disclose nitrogen-based and oxygen-based surface chemistries that promote adhesion of gelatin-containing layers to respective nitrogen-plasma-treated and oxygen-plasma-treated polyester webs, also for the manufacture of supports usable for photosensitive materials.

The method of conveyance of the web material through the treatment zone has an important effect on the nature of the plasma treatment. In the case of Tamaki et al., the polymer surface to be treated is electrically floating in the discharge zone and moves past one or more powered discharge electrodes. In the case of Dolazalek et al., if the drum is electrically isolated from the walls of the apparatus, the article also is electrically floating in the discharge zone and moves past one or more powered discharge electrodes. If the drum is electrically grounded, however, the surface potential of the polymer article is determined by several factors. These factors include thickness and dielectric properties of the article, the driving frequency of the discharge, the electron density and plasma potential of the discharge, and the relative areas of the discharge electrode and the combination of the drum surface and the grounded inner walls of the apparatus. At sufficiently low driving frequency (the upper limit being determined by the aforementioned characteristics of the article and plasma), the article surface will charge to the floating potential and the situation will be similar to that of an electrically isolated drum. At sufficiently high driving frequency (the lower limit being determined by aforementioned characteristics of the article and plasma) the surface of the article will remain near ground potential. Consequently, if the effective grounded surface area in the discharge zone is significantly larger than that of the powered electrode(s), the surface of the article to be treated is generally bombarded by ions having a bombardment energy that is largely determined by the difference between a plasma potential of some tens of volts and a ground potential.

In contrast, if the areas of the powered electrode(s) and the effective grounded electrode are comparable, the ion bombardment of the polymer article will be largely determined by the potential applied to the powered electrode and can have a peak value of several hundred volts or more. In this case, the ion bombardment energies are more characteristic of an etch process. The etching character of the process can be further enhanced by reducing the area of the polymer article, supporting electrode (e.g., drum), and effective grounded surface area relative to that of the driven electrode(s), or by electrically isolating the supporting electrode of reduced area and applying the driving voltage thereto. The effect of the relative areas of driven and grounded electrodes on the effective bombarding potentials at their respective surfaces is well known to those skilled in the art of plasma processing for microelectronics. In that art it is known that alternating-current discharges established between a driven electrode and a ground electrode of equal size produce similar bombardment effects at either electrode. It is also known that alternating-current discharges established between electrodes of dissimilar area produce more bombardment at the smaller electrode. It is further known that higher frequency discharges operate at lower amplitudes of driving voltage (for comparable input power). Thus the bombarding potential is also reduced as driving frequency increases. The aforementioned behavior of the bombarding potential at the electrode surfaces applies reasonably well throughout the radio frequency range (i.e., ~3 kHz to ~100 MHz). For the purposes of surface modification of polymer webs, treatments in which significant ion bombardment and etch processes may occur have generally been avoided in the prior art related to supports for photographic elements. While the object of polymer surface modification is generally to introduce new chemical species into the surface region by reaction with species in the electrical discharge, the object of etch processes is to remove significant amounts of material from the surface region. Furthermore, these etch processes are considered undesirable because the materials to be modified tend to be temperature sensitive and etch processes can generate substantial heat or may generate considerable low-molecular-weight fragments in the surface region of the treated support.

Examples of background art that teach away from using etch-like processes for the purposes of polymer surface modification are found in the open literature. J. E. Klemberg-Sapieha et al (*J. Vac. Sci. Technol. A*, 9 (6) (1991) 2975–81) disclose a dual-frequency approach to modification of polymer surfaces in nitrogen plasma and in ammonia plasmas. In their work, the high-frequency microwave power couples effectively to the bulk of the discharge zone and generates the chemically active species in the plasma. By applying a lower frequency (rf: 13.56 MHz) potential to the substrate holder, they create a significant bias potential, which results in significant bombardment of the substrate (i.e. polymer article being treated) by ions extracted from the plasma. Their work shows clearly that the maximum amount of nitrogen incorporated into the treated polymer surface is for the microwave plasma with no applied rf potential. As the rf potential is applied (resulting in bias potentials of up to 500 V) the incorporated nitrogen decreases for both nitrogen and ammonia plasmas and for both polymers studied in their work (i.e., polyethylene and polyimide). While dual-frequency approach has shown much success for tailoring the properties of hard coatings such as silicon nitride and diamond-like carbon (see for example, J. E. Klemberg-Sapieha et al. in *Rarefied Gas Dynamics: Experimental Techniques and Physical Systems*, B. D. Shizgal and D. P. Weaver, eds., *Progress in Astronautics and Aeronautics*, vol. 158, A. R. Seebass, Editor-in-chief, American Institute of Aeronautics and Astronautics, Inc., 1993), the application of this approach to polymer surface modification has suggested that enhanced ion bombardment by use of a low-frequency bias is generally disadvantageous.

Another example of using a plasma source with a separately biased sample holder is found in the work of S. Han et al. (*Surface Coatings Technology* 93 (1997) 261–4) and Lee et al. (J. Vac. Sci. Technol. A 16(3), (1998) 1710–15). Han et al and Lee et al use an rf (13.56 MHz) inductively coupled plasma source (with magnetic enhancement) in combination with a pulse generator used to apply short (10–20 $\mu$s) high-voltage (up to −10 kV) pulses to the substrate holder. In their work, Han et al. and Lee et al. found that the use of high-voltage pulses alone to generate a discharge and effect surface modification is less effective than the use of the rf plasma in combination with high-voltage pulses applied to the substrate holder. Furthermore, they found that the use of the rf-driven plasma alone is less effective than in combination with the high-voltage pulses.

The results for the use of the high-voltage pulses alone are consistent with the findings of Klemberg-Sapieha et al. (described above) that applying a bias voltage to the substrate holder is not advantageous for polymer surface modification. In contrast, the results for the combination of an rf plasma and high-voltage pulses as compared to the rf plasma alone appears to show some interesting effects. The apparatus as described by Han et al. and Lee et al., however, has several drawbacks. First, the high-voltage pulses are short (microseconds) and must be applied repetitively (1 kHz, e.g.) for significant time (several minutes) to modify polymer surfaces to the degree shown by Han. et al and Lee et al. Second, the apparatus requires rf power to be applied in an inductively coupled configuration, high-voltage pulsing electronics, and permanent magnets. Third, the apparatus as described is clearly designed to treat small articles such as silicon wafers, as opposed to wide continuous rolls of web. All of the above drawbacks present complications for application of this technology to high-speed treatment of polymer supports.

Grace et al. disclose the use of nitrogen plasmas and oxygen plasmas to treat polyester supports for promoting the adhesion of aqueous coatings thereto. Using low-frequency (60 Hz–40 kHz) discharges with the polyester support electrically floating in the plasma, Grace et al. found nitrogen-containing and oxygen-containing surfaces that are demonstrated to promote excellent adhesion between gelatin-containing layers and plasma-treated polyester supports. The doses demonstrated to produce good adhesion are in the range of 0.5–4 J/cm$^2$. (This dose parameter is calculated based on the delivered power, the width of the treatment zone and the web speed: Dose=Power /[width×web speed].) In this dose range, treatment times of 1 s and somewhat below are readily attainable on the manufacturing scale. Grace et al. teach the appropriate surface chemistry for the given application and disclose optimized treatment parameters. Neither the use of substrate bias voltage, nor the use of an etch-mode plasma treatment are disclosed, nor is it suggested that such approaches should be more effective at obtaining the desired surface chemistry. The present invention relates to the efficient production of surfaces bearing chemical similarity to those disclosed by Grace et al.

SUMMARY OF THE INVENTION

It is therefore an object of the present invention to provide a method and apparatus for obtaining high-efficiency plasma treatments of imaging supports and polymeric support materials using nitrogen or oxygen plasmas.

It is a further object of the present invention to provide a method and apparatus for obtaining high-efficiency plasma treatments of imaging supports and polymeric support materials at low treatment doses.

Still another object of the present invention is to provide a method and apparatus for obtaining high-efficiency plasma treatments of imaging supports and polymeric support materials with reduced power consumption.

Yet another object of the present invention is to provide a method and apparatus for obtaining high-efficiency plasma treatments of imaging supports and polymeric support materials with increased treatment speed.

A further object of the present invention is to provide high-efficiency treatments requiring simple power supplies and using low-density capacitively coupled plasmas, as opposed to magnetically enhanced plasmas, microwave plasmas, or scenarios requiring fast high-voltage pulses.

Still another object of the present invention is to reduce required treatment times and/or reduce the required treatment powers required to produce surface treated polyesters suitable for production of imaging elements, photographic supports, and film bases.

Briefly stated, the foregoing and numerous other features, objects and advantages will become readily apparent upon a review of the detailed description, claims and drawings set forth herein. These features, objects and advantages are accomplished by passing the polymer (eg. polyester) support surface through the high-voltage sheath region of the plasma generated by a powered electrode residing in a discharge zone. The frequency of the driving voltage must be above a lower bound dictated by the properties of the polymer support and the plasma, and it must be below an upper bound beyond which the sheath voltages drop significantly and it is observed that the benefits of this approach diminish. Like Lee et al. and Han et al., it has been found that the present invention is an improvement over the use of a simple rf plasma (driven at 13.56 MHz) to treat webs. In contrast, however, it has also been found that significant improvements in treatment efficiency are gained by placing the web on the treatment electrode and by reducing the driving frequency considerably below 13.56 MHz. These improvements are gained without the need for a second power source, such as the high-voltage pulse source described by Han et al. and Lee at al. Furthermore, the treatments can be carried out in a continuous mode rather than a pulsed mode. These results are demonstrated for a single treatment electrode and do not require a plurality of electrodes as taught by Dolazalek et al. and Tamaki et al. Finally, these results are demonstrated for a low-density, capacitively coupled plasma source, without the need for magnetic enhancement or inductive coupling as used by Han et al. and Lee et al. The demonstrated treatment improvements reduce the required treatment dose by an order of magnitude, thus enabling significant increases in web conveyance speed and/or significant reductions in applied power to effect a surface treatment. These high-efficiency treatments generate appropriate surface chemistry for adhesion between polyester supports and aqueous coatings.

The efficiency of the method of the present invention is evidenced by significant treatment effect at low treatment doses (where dose is as described above). Low treatment doses translate to manufacturing benefits in terms of increased treatment speed, reduced power consumption, or a combination of both. The gains in treatment speed may be sufficient to allow treatment in line with photographic sensitizing at high speeds (for example, curtain coating of photographic emulsions at 300 m/min line speeds).

While the objectives of this invention relate to providing adhesion between gelatin-containing layers and plasma-treated polymer supports, it should be apparent to those skilled in the art that it may be applied to other kinds of coatings on plasma-treated polymer supports. This invention may be applied to any coating capable of favorable chemical interaction with amines or imines (as resulting from nitrogen plasma treatment) or ether, epoxy, hydroxyl, carboxyl, or carbonyl groups (as resulting from oxygen plasma treatment). For example, this invention can be applied to metallized plastics, such as for example silver coated on polyesters (as described in U.S. Pat. No. 5,324,414). It can also be applied to latex polymer dispersions or polymer solutions coated onto plasma-treated polymer supports. It can further be applied to coating of hydrophilic colloid layers onto plasma-treated supports. It can also be applied to grafting of selectively reactive species onto plasma-treated supports such as, for example, vinylsulfone hardening agents used as tie layers or anchors, as described in Grace et al (U.S. Pat. No. 5,563,029).

DESCRIPTION OF THE PREFERRED EMBODIMENT

Figure 1:
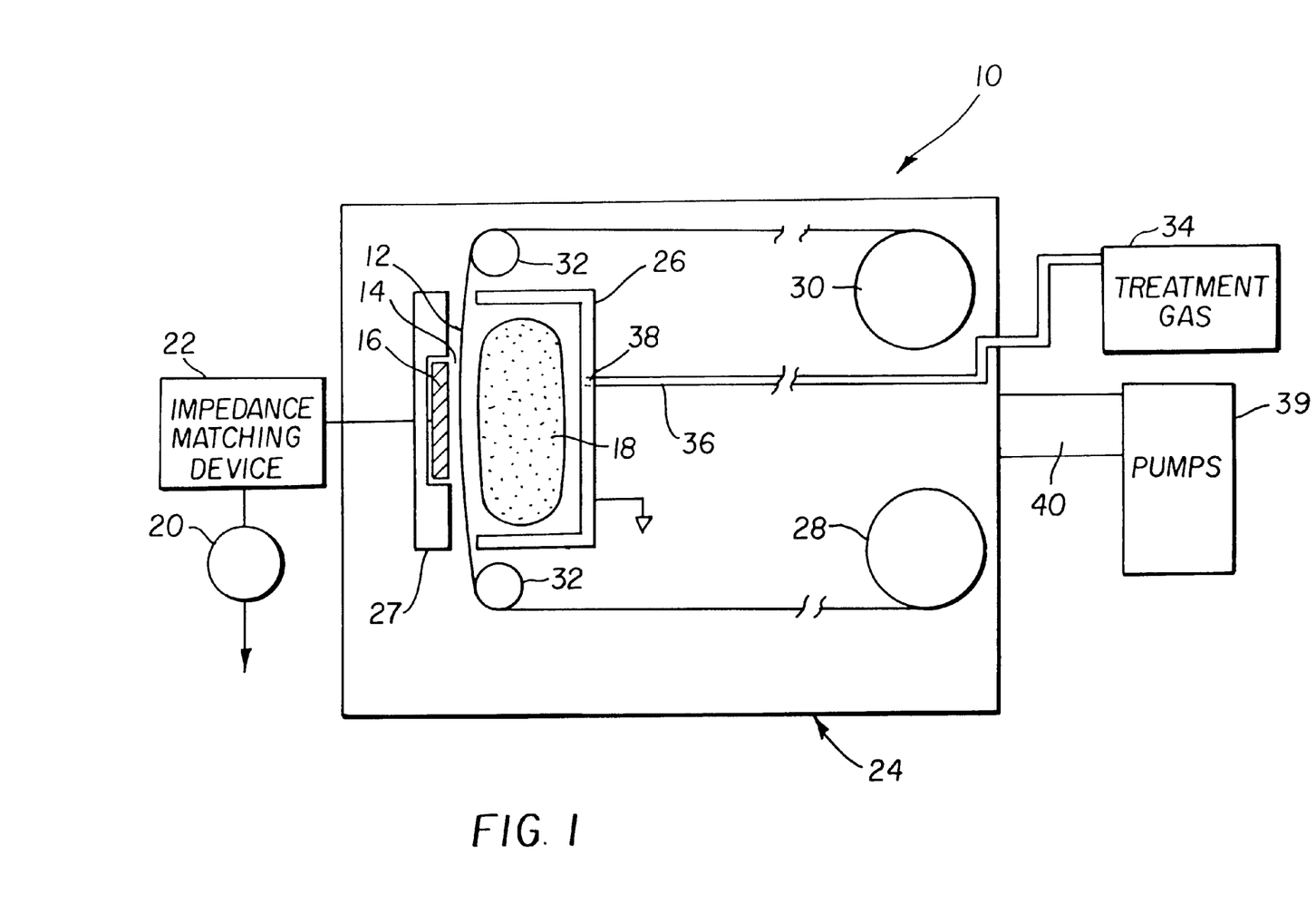
FIG. 1 is a schematic depicting a first embodiment of the treatment apparatus of the present invention.

Turning first to FIG. 1, there is schematically depicted a treatment apparatus 10 wherein the web 12 does not touch an electrode, but in contrast to the floating web configuration, the space 14 between the web 12 and the driven (smaller) treatment electrode 16 is a "dark space" (see Chapman). The term "dark space" as used herein is defined as a region wherein the breakdown voltage is locally higher than in other regions of a plasma-containing volume; it can also be a volume wherein proximity of surfaces and their associated losses prevents bulk ionization and thus prevents screening of electric fields. A dark space can be created by positioning of grounded surfaces near electrodes, or it can occur naturally by generation of a plasma sheath region near an electrode. Dark spaces are characterized by low luminosity, low ion density, and the lack of ability to screen out considerable electric fields. The dark space 14 supports the strong electric field that results from applying a high voltage to the treatment electrode 16, and the surface of the web 12 essentially serves as the electrode in contact with the plasma 18. Alternating high-voltage is applied by use of a power supply 20 and an appropriate impedance matching device 22. The extent of the dark space 14 is determined by the working gas, the applied voltage and power, the driving frequency, and geometrical factors such as the distance between the web 12 and other surfaces in the chamber 24, including that of a second or counter electrode 26. The plasma zone is defined by an enclosure. The enclosure preferably comprises second electrode 26 and shield 27 for the treatment electrode 16. Alternatively, the enclosure for the plasma zone can be the vacuum chamber 24 itself. The treatment zone is in the dark space 14 between the treatment electrode 16 and the plasma 18. Although not shown, those skilled in the art will recognize that the treatment electrode 16 and second electrode 26 should be cooled as appropriate for heat load taking into account the material from which the treatment electrode 16 and second electrode 26 are made.

The path of web 12 is defined by a web drive/conveyance system which includes take-up roller 28, unwind roller 30, and idler rollers 32 as well as any other devices required to convey the web 12 from the unwind roller 30 through the treatment zone, and to the take-up roller 28. Treatment gas 34 is provided to the treatment zone by a suitable gas delivery line 36 and inlet 38, which can be a showerhead or some other arrangement of suitable openings into the treatment zone. For operation with treatment gases other than air, the region outside the treatment zone is pumped to below the treatment pressure using appropriate pumps 39 and plumbing 40. For operation in air, the treatment zone may be pumped, and the external chamber 24 may provide the flow of treatment gas.

Figure 2:
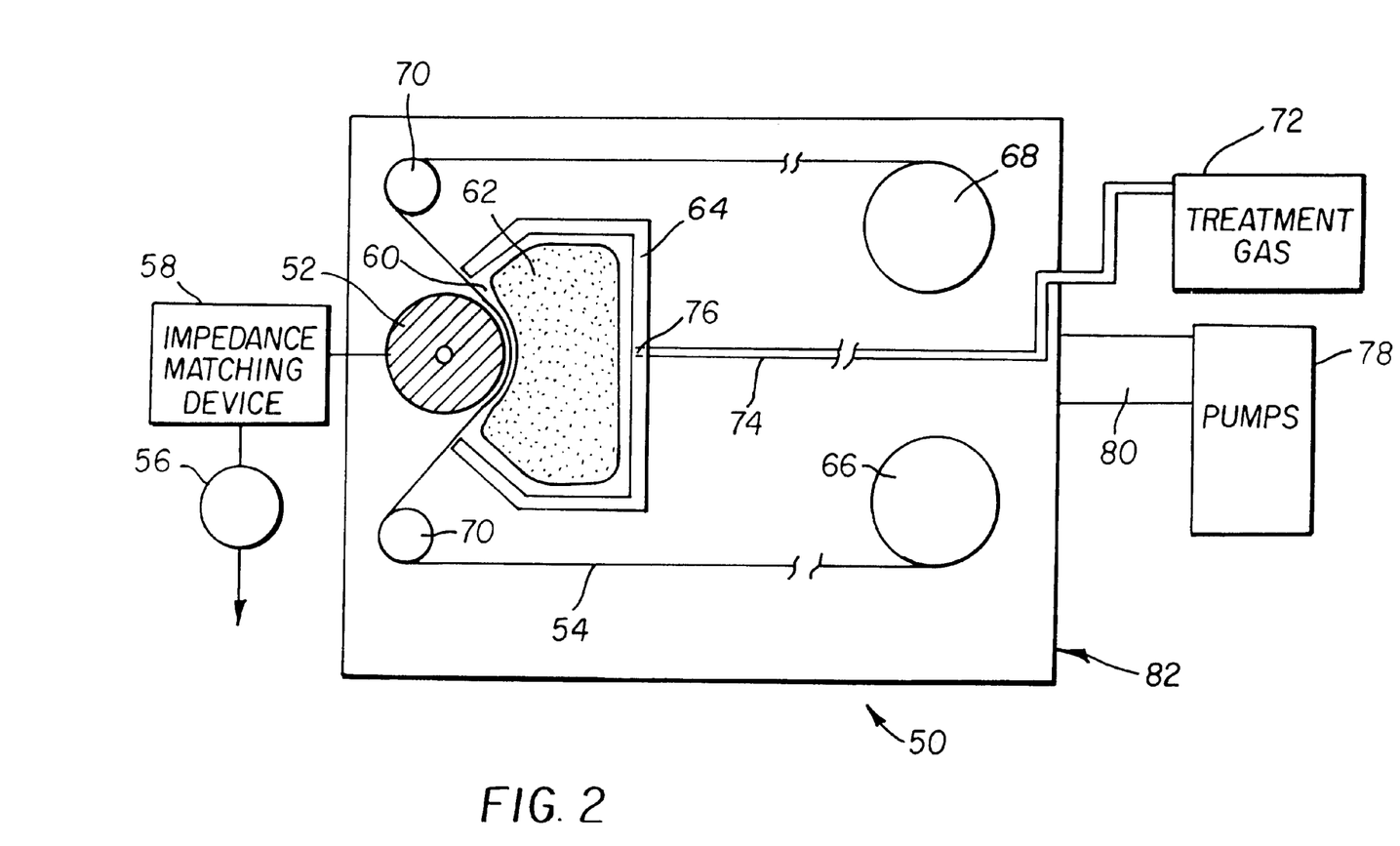
FIG. 2 is a schematic depicting an alternative embodiment of the treatment apparatus depicted in FIG. 1.

Looking next at FIG. 2 there is schematically illustrated an apparatus 50 which is an alternative embodiment of the apparatus 10 depicted in FIG. 1. Apparatus 50 has a configuration in which an electrically isolated roller 52 is used as a treatment electrode (driven and smaller electrode). The web 54 is placed against the roller 52, and alternating high voltage is applied to the roller 52 by use of a power supply 56 and an impedance matching device 58. As in FIG. 1, there is a dark space 60, a plasma 62, and a second or counter electrode 64. The second electrode 64 may be used to define the discharge volume.

The path of web 54 is defined by a web drive/conveyance system which includes take-up roller 66, unwind roller 68, and idler rollers 70 as well as any other devices required to convey the web 54 from the unwind roller 68 through the treatment zone, and to the take-up roller 66. Treatment gas 72 is provided to the treatment zone by a suitable gas delivery line 74 and inlet 76, which can be a showerhead or some other arrangement of suitable openings into the treatment zone. For operation with treatment gases other than air, the region outside the treatment zone is pumped to below the treatment pressure using appropriate pumps 78 and plumbing 80. For operation in air, the treatment zone may be pumped, and the external chamber 82 may provide the flow of treatment gas.

Figure 3:
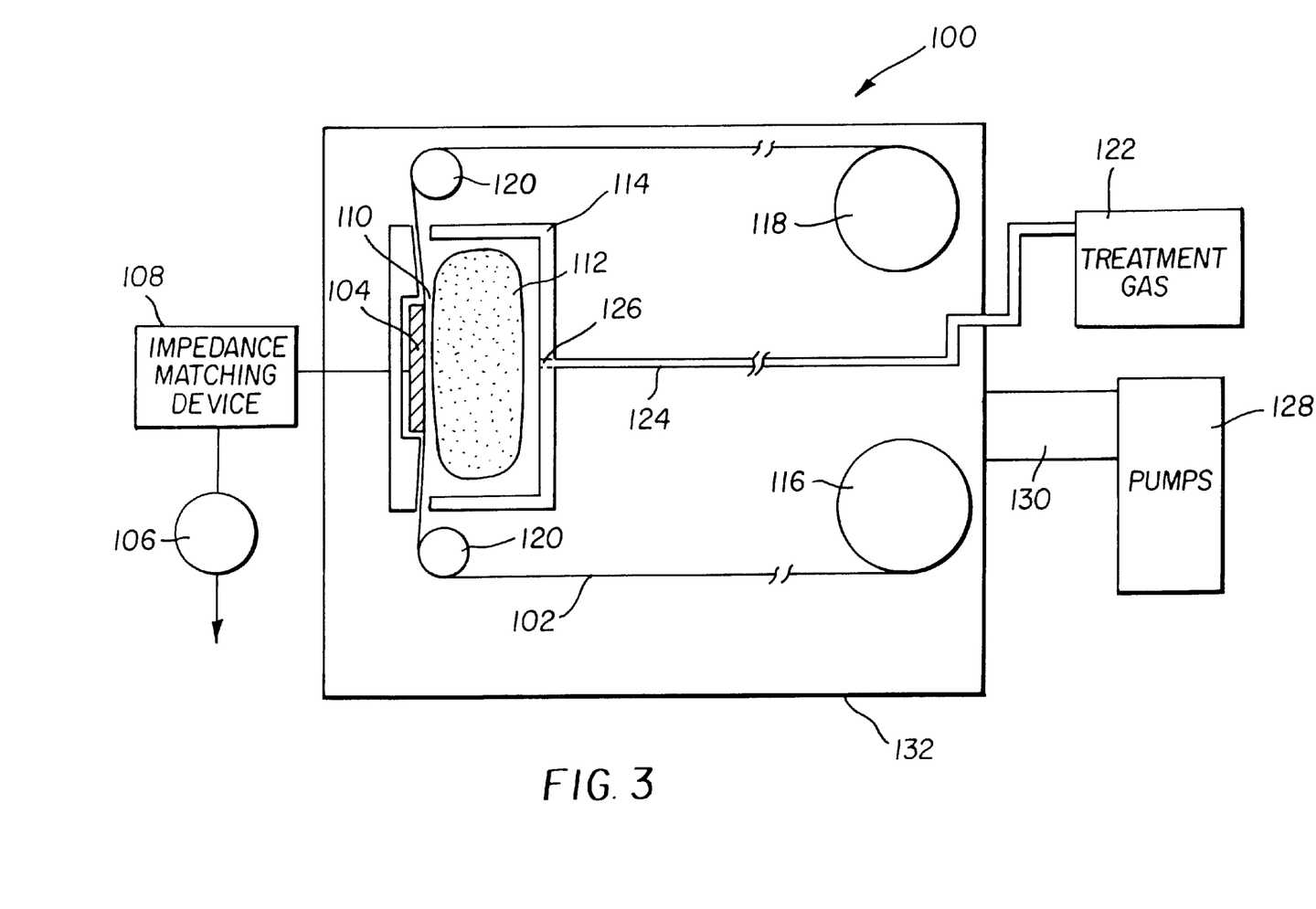
FIG. 3 is a schematic depicting another alternative embodiment of the treatment apparatus depicted in FIGS. 1 and 2.

FIG. 3 schematically illustrates an apparatus 100 which is yet another alternative embodiment of the apparatus 10 and the apparatus 50 depicted in FIGS. 1 and 2, respectively. Apparatus 100 has a treatment configuration in which the rear surface of the web 102 is in contact with a stationary, electrically driven (smaller) electrode 104. Alternating high voltage is applied to the electrode 104 by use of a power supply 106 and appropriate impedance matching device 108. As in FIG. 1, there a dark space 110, a plasma 112, and a second or counter electrode 114. As shown, the second electrode 114 may be used to define the discharge volume. The path of web 102 is defined by a web drive/conveyance system which includes take-up roller 116, unwind roller 118, and idler rollers 120, as well as any other devices required to convey the web 102 from the unwind roller 118 through the treatment zone, and to the take-up roller 116. Treatment gas 122 is provided to the treatment zone by a suitable gas delivery line 124 and inlet 126, which can be a showerhead or some other arrangement of suitable openings into the treatment zone. For operation with treatment gases other than air, the region outside the treatment zone is pumped to below the treatment pressure using appropriate pumps 128 and plumbing 130. For operation in air, the treatment zone may be pumped, and the external chamber 132 may provide the flow of treatment gas.

The exact configuration of web drive/conveyance system, chambers, enclosures and pumps is dictated by the required treatment pressure, the required treatment gas purity, and the quality of any seals made between higher and lower pressures by baffling, nip rollers, or the like in the web path. While the web drive/conveyance system is indicated to be within the vacuum chamber 24, 50, 132, the treatment geometries depicted in FIGS. 1–3 may readily be incorporated into an "air-to-air" device, wherein the wind and unwind rollers are placed outside the vacuum chamber 24, 50, 132, and the web 12, 54, 102 passes through differentially pumped regions and appropriate pressure seals (i.e., constricted openings and baffles or nip regions) placed before and after the treatment zone.

In the practice of the present invention, a polymer web 12, 54, 102 is conveyed through a plasma zone such that the surface to be treated lies in the sheath region (dark space 14,60, 110) of a driven electrode 16, 52, 104. Furthermore, the area of the driven electrode 16, 52, 104 is significantly smaller than the area of the counter electrode 26, 64, 114 or grounded surface area, such that the peak voltage drop across the driven electrode sheath is comparable to twice the amplitude of the driving voltage. The driving frequency is lower than 13.56 MHz, is chosen (as described above) based on the charging time of the polymer surface, and is preferably 450 kHz or lower.

The treatment gas 42, 72, 122 may contain nitrogen or oxygen, mixtures of nitrogen or oxygen with inert gases (such as argon or helium), mixtures of nitrogen with hydrogen-containing gases (such as hydrogen or ammonia), mixtures of oxygen with oxygen containing gases (such as carbon dioxide), or mixtures of nitrogen and oxygen (such as air). The treatment gas 42, 72, 122 may also contain water vapor or mixtures of water vapor with inert or reactive gases. For reasons of safety and cost, the treatment gas 42, 72, 122 is preferably nitrogen, oxygen or mixtures thereof and is chosen depending on the desired surface chemistry on the polymer support 12, 54, 102 to be treated. Treatment pressures and gas flows must also be adjusted for the desired surface chemical effects and can be optimized by those skilled in the art. The maximum possible operating pressure at which a glow-discharge plasma exists in the treatment zone is determined by the gas, the geometry of the treatment zone, and the mode of establishing and sustaining the discharge.

The polymer web 12, 54, 102 may contain aliphatic hydrocarbons, aromatic hydrocarbons, ester groups, or combinations thereof, the exact composition being dictated by the usage and functioning of the article to be coated. The coating may be gelatin-containing layers or any required coating known to be reactive with amines or imines, as produced by nitrogen plasma treatment. The coatings may also be any required coatings known to be reactive with ether, hydroxyl, epoxy, carbonyl and carboxyl groups as produced by oxygen plasma treatment. In a preferred embodiment of the present invention, the polymer substrate is a polyester, such as poly(ethylene terephthalate) or poly (ethylene naphthalate).

The coatings (priming or subbing layers) applied to the treated polymer supports 12, 54, 102 are those which are reactive with amines and imines (in the case of nitrogen treatments) or ether, epoxy, hydroxyl, carbonyl, or carboxyl groups (in the case of oxygen plasma treatments). Preferably, the coatings are: hydrophilic colloid layers, such as gelatin, and blends thereof with hydrophilic nonphotosensitive polymers; amine reactive hardening compounds, such as bisvinylsulfonylmethane, or blends thereof with gelatin or hydrophilic nonphotosensitive polymers; or polymeric hardeners containing amine-reactive side groups. Alternatively, hydrophyllic colloid layers such as photographic emulsions can be applied to the treated polymer supports 12, 54, 102.

Figure 4:
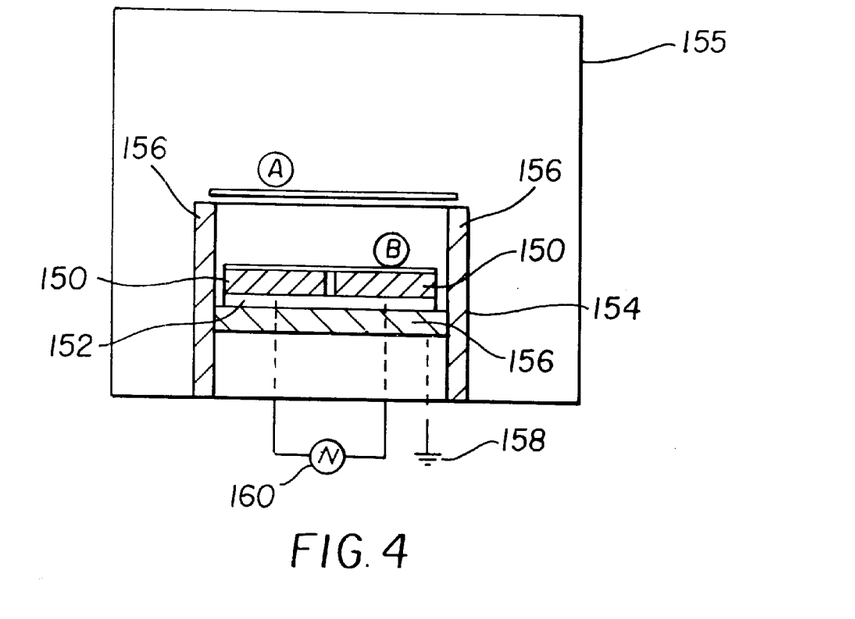
FIG. 4 is a cross-sectional schematic of a test apparatus of the present invention used to conduct the 40 kHz treatments of Experiment 1.
Figure 5:
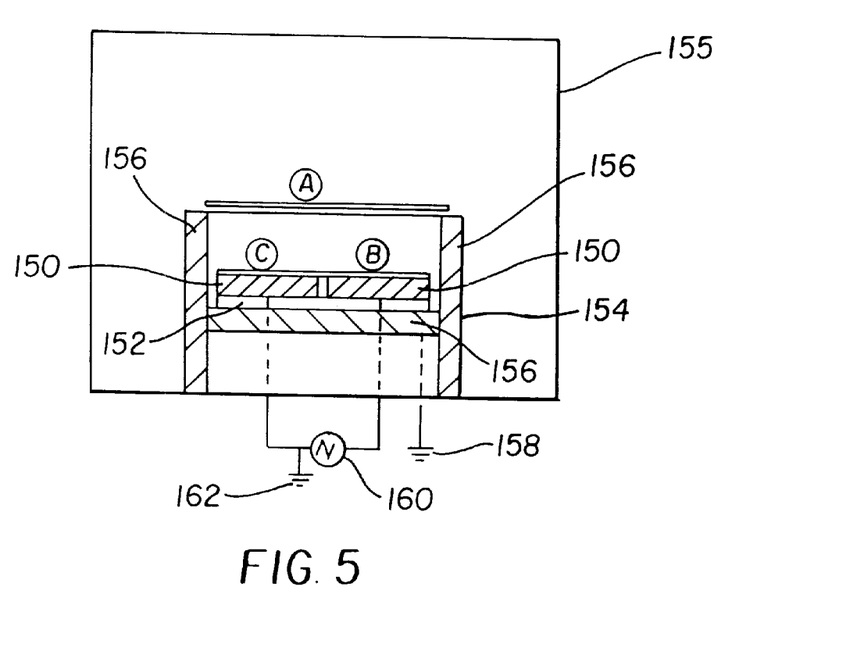
FIG. 5 is a cross-sectional schematic of a test apparatus of the present invention used to conduct the 450 kHz and 13.6 MHz treatments of Experiment 1.

Looking next at FIGS. 4 and 5, there is shown a cross-sectional schematic of a test apparatus used to conduct Experiment 1 described below. The test apparatus included two water-cooled, coplanar aluminum electrodes 150 which were mounted on a backing plate 152 and housed in a grounded aluminum shield or enclosure 154. The electrodes 150 were placed in a cryo-pumped vacuum chamber 155. The electrode dimensions were approximately 16.5 cm×5.1 cm×1.27 cm (length×width×thickness). The coplanar electrodes 150 were placed with long sides next to each other, separated by a gap of approximately 0.32 cm. The pair of electrodes 150 was placed on 0.32 cm thick ceramic spacers (not shown), which in turn rested on the aluminum backing plate 152 (approximately 17.1 cm×11.1 cm×1.27 cm (length×width×thickness). Holes in the aluminum plate and the electrodes 150 permitted fixturing of the electrodes 150 to the backing plate 152, electrical contact to the electrodes 150, and inflow and outflow of cooling water for the electrodes 150. Side walls 156 of enclosure 154, made of 1.27 cm aluminum plates, provided support for the electrodes 150 and backing plate 152 and extended roughly 2.5 cm above the front surface of the coplanar electrodes 150. The walls 156 contacted the perimeter of the backing plate 152 and were perpendicular thereto. The walls 156 and backing plate 152 were electrically grounded 158. A power supply 160 was connected to the pair of electrodes 150. In FIG. 5, the output of the power supply 160 is referenced to ground by connecting one side to ground 162. The configuration depicted in FIG. 4 was used to conduct the 40 kHz treatments in Experiment 1. The configuration depicted in FIG. 5 was used to conduct the 450 kHz and 13.6 MHz treatments in Experiment 1.

The specifics of the invention relate to plasma treatment of polyester support for the aforementioned purposes. Nonetheless, it should be apparent to those skilled in the art that the same concepts (i.e. appropriate placement of the article to be treated, combined with appropriate choice of driving frequency as described herein) may prove fruitful for boosting the efficiency of plasma treatments of other polymer supports for other purposes. For example, the high-efficiency approach described herein can be applied in general to polyesters, such as for example poly(ethylene terephthalate) (PET), polycycloalkylene terephthalates (such as, poly(cyclohexylene dimethylene terephthalate)), and poly(ethylene napthalate) (PEN); blends of polyesters with other polyesters, such as poly(ethylene terephthalate) blended with poly(ethylene naphthalate), poly(ethylene terephthalate) blended with poly(cyclohexylene dimethylene terephthalate) (PCHDMT), poly(cyclohexylene dimethylene terephthalate) blended with poly(ethylene napthalate), poly(ethylene terephthalate) blended with polyarylates, poly (ethylene napthalate) blended with polyarylates, and poly (cyclohexylene dimethylene terephthalate) blended with polyarylates; polyesters blended with polycarbonates, such as PET, PEN, or PCHDMT with the polycarbonates of bisphenol-A, polycarbonates of 3,3,5-trimethylene-bisphenol, or copolycarbonates containing both bisphenols; polyesters blended with polyetherimide (PEI), such as PEN blended with PEI, PET blended with PEI, and PCHDMT blended with PEI; polyolefins, such as for example polyethylene and polypropylene; polystyrenes, such as for example polystyrene (tactic, atactic, or syndiotactic) and poly-α-methyl styrene; acrylesters such as, for example, polymethylmethacrylate; polycarbonates; and cellulose derivatives such as, for example, cellulose triacetate, cellulose acetate butyrate and the like. It may also be applied to polysulfones and polyetherimides. It may also be applied to laminates comprising materials such as mentioned above and other kinds of supports, such as paper or metallic webs. (In the case of metallic webs, additional effort would be required in the design of the treatment zone housing such that a high-voltage sheath is present above the metallic web surface.) A series of experiments was carried out on poly (ethylene-2, 6-naphthalate) (PEN). The first experiment demonstrated the importance of driving frequency in determining the relative treatment effects for samples located on a driven small electrode and electrically floating samples located a distance from the driven electrode. The second experiment demonstrated the use of low driving frequency in combination with placing the sample on the driven small electrode to produce efficient and effective nitrogen plasma treatments. The third experiment demonstrated the use of low driving frequency in combination with placing the sample on the driven small electrode to produce efficient and effective oxygen plasma treatments.

EXPERIMENT 1

The Unexpected Effect of Sample Position as a Function of Driving Frequency

Samples of 100 $\mu$ thick poly(ethylene-2, 6-naphthalate) were placed on the electrodes 152 (position A, FIG. 4) and 2.5 cm above the front surface of the coplanar electrodes 150 (position B, FIG. 4), the latter position being referred to as the "floating" position. The chamber 155 (volume~250 l) was pumped to a base pressure below $3\times10^{-5}$ Torr. Nitrogen gas was admitted to the chamber 155 at a flow between 80 and 100 SCCM. A cryo pump gate valve (not shown) was throttled until the steady-state chamber pressure reached 0.1 Torr. After purging the chamber 155 at steady state for 3 minutes, power was applied to the electrodes 150 at a specified level for a specified treatment time.

Three power supply configurations were used. A 40 kHz supply (Advanced Energy PE-1000) with a matching transformer was used to apply a high-voltage waveform across the two electrodes with neither one electrically grounded (see FIG. 4). A variable frequency supply (Plasmaloc 2 HF) was used to apply a 450 kHz high-voltage waveform across the two electrodes, with one electrode electrically grounded. Finally, a higher frequency supply (ENI 0.5–35 MHz power amplifier and autotuning network, driven by a Wavetek waveform generator) was used to apply a 13.6 MHz high-voltage waveform across the two electrodes, with one electrode electrically grounded. The latter two configurations (as used with the configuration depicted in FIG. 5) enabled observation of the effects of electrode size on the nature of the treatment. The grounded surface was comprised of the grounded electrode 150 and the inner walls of the ground shield 154, with the driven electrode surface then being considerably smaller than the total grounded surface. Sample positions indicated as A, B, and C in FIG. 5 are respectively referred to as "floating", "driven, smaller electrode", and "grounded electrode".

Surface chemical changes in the PEN samples were assessed by use of x-ray photoelectron spectroscopy (XPS). Analyses were performed using a Physical Electronics 5601 photoelectron spectrometer with monochromatic A1 K$\alpha$ x-rays (1486.6 eV). The x-ray source was operated with a 2 mm filament at 350 W. Charge neutralization for these insulating polymers was accomplished by flooding the sample surface with low-energy electrons ($\leq$25 mA emission current, $\leq$0.5 eV bias voltage) from an electron gun mounted nearly perpendicular to the sample surface. The pressure in the spectrometer during analysis was typically $3\times10^{-9}$ Torr. For the high-resolution spectra, the analyzer was operated at a pass energy of 11.75 eV. Under these conditions, the full width at half maximum (FWHM) for the individual components of the C 1s peak in an untreated PEN sample varied from 0.8 to 0.9 eV. All spectra were referenced to the C 1s peak for the carbon atoms in the naphthalene ring in PEN, which was assigned a value of 284.6 eV. Spectra were taken at a 45° electron take-off angle, which corresponds to an analysis depth of ~5 nm.

XPS metrics found to be helpful in assessing changes are incorporated nitrogen, oxygen loss, and ester rearrangement. In addition, the chemical environment of the incorporated nitrogen was assessed.

Assessment of the ester rearrangement was done by examination of the XPS O 1s spectrum. For nitrogen plasma treated PEN, the O 1s spectrum undergoes interesting changes as a function of treatment dose. At low doses, the characteristic ester doublet is still present but the band begins to broaden slightly. As the dose is increased, the intensity of the ester type oxygen (C—O—C) begins to decrease relative to the carbonyl type oxygen (C=O). At the highest dose, the ester doublet almost coalesces into one peak at ~532.0 eV with little evidence of the ester type oxygen. These results suggest that the ester functionality is severely disrupted at high doses. These results also suggest that primarily carbonyl-like species are formed at intermediate to high doses with nitrogen plasma treatment. These carbonyl-like species can either be aldehydes, ketones, carbonyls associated with an amide functionality, or carboxyl groups.

This ester rearrangement into carbonyl-like species can be used as a measure of the extent of plasma treatment. To quantify the ester rearrangement, the O 1s spectra for all the treatments were overlaid and rank ordered from the lowest rearrangement (closest to the characteristic ester doublet) to the highest rearrangement (closest to a carbonyl singlet). This ranking is then refined to reflect the degree of change from one value to the next. This procedure was applied to samples FLN1–FLN15 (see Experiment 2 below), and ester rearrangement from all other nitrogen plasma treatments was assessed by comparison with the results from samples FLN1–FLN 15. The resultant scale of ester rearrangement is from 0 (no effect of treatment) to 11 (maximum affect seen in samples FLN1–FLN15).

The results for the three different power supply configurations are shown in Table 1. From Table 1 it can be seen that the differences in treatment effect between samples in the driven (smaller) electrode position and those in the floating positions are sensitive to driving frequency. For example, when comparable treatment doses are applied (samples 1, 2, and 5), the treatments at 40 kHz and 450 kHz exhibit considerable differences (in incorporated nitrogen) from driven electrode position to floating position, whereas the 13.6 MHz treatment results in comparable nitrogen incorporation at either position. Furthermore, for comparable nitrogen incorporation in the floating position (i.e. when the dose of the 13.6 MHz treatment is reduced), the difference in nitrogen incorporation from driven electrode to floating position increases, but is still considerably less than the difference seen for the lower-frequency treatments.

TABLE 1

Treatment conditions and treated PEN surface chemistry results for various driving frequencies and sample positions.

| RUN | Frequency (kHz) | Position | Power (w) | Time (Sec.) | % N | N1s Centroid (eV) | % O | Ester Rearrangement |
|---|---|---|---|---|---|---|---|---|
| Untreated | N/A | N/A | N/A | N/A | 0 | N/A | 22.2 | 0 |
| 1a | 40 | Floating | 100 | 10 | 10.4 | 399.9 | 22.9 | 5 |
| 1b | 40 | Driven, Smaller Electrode | 100 | 10 | 16.8 | 399.0 | 9.7 | 8 |
| 2a | 450 | Floating | 100 | 15 | 9.3 | 399.8 | 21.1 | 5 |
| 2b | 450 | Driven, Smaller Electrode | 100 | 15 | 15 | 399.2 | 11.8 | 8 |
| 2c | 450 | Grounded Electrode | 100 | 15 | 6.4 | 399.5 | 21.5 | 4 |
| 3a | 13600 | Floating | 10 | 10 | 8.4 | 399.7 | 19.9 | 4 |
| 3b | 13600 | Driven | 10 | 10 | 11.2 | 399.5 | 16.5 | 5 |
| 3c | 13600 | Grounded Electrode | 10 | 10 | 8.6 | 399.8 | 20.3 | 4 |
| 4a | 13600 | Floating | 40 | 10 | 15.1 | 399.8 | 18.2 | 5 |
| 4b | 13600 | Driven | 40 | 10 | 16.2 | 399.5 | 13.8 | 5 |
| 4c | 13600 | Grounded Electrode | 40 | 10 | 13.2 | 399.7 | 19.3 | 5 |
| 5a | 13600 | Floating | 100 | 10 | 17.5 | 399.6 | 16.6 | 6 |
| 5b | 13600 | Driven | 100 | 10 | 18.6 | 399.5 | 13.8 | 6 |
| 5c | 13600 | Grounded Electrode | 100 | 10 | 16.3 | 399.7 | 17.5 | 6 |

The above results demonstrate that, for samples in the floating position, the 13.6 MHz treatment is more efficient at incorporating nitrogen into the polymer surface. Surprisingly, however, the lower-frequency treatments can have comparable nitrogen incorporation efficiency, for samples on the driven electrode. Thus, the apparent efficiency of higher frequency discharges is obtained at significantly lower frequency (450 kHz and below) without the complications associated with power delivery and impedance matching in the MHz frequency range.

In addition to the total amount of nitrogen incorporation, one must evaluate the chemical nature of the nitrogen-containing groups formed on the polymer surface. In particular, there are several forms of nitrogen-containing groups that prove beneficial for adhesion of gelatin-containing layers. Amines (primary, secondary, or tertiary) and imines (primary or secondary) that can be formed by incorporation of nitrogen into the polyester repeat unit are reactive with a variety of organic groups, such as carboxyl, hydroxyl, and anhydride groups. (As a particular example, the carboxylic acid groups in the side chains of gelatin can be expected to be reactive with amine groups introduced by surface treatment.) The amine and imine groups are also quite significant for the use of vinyl-containing or other amine-reactive linking agents, such as bisvinylsulfonylmethane (as described by Grace et al in U.S. Pat. No. 5,563,029). In contrast, amides that can be formed are significantly less reactive with these groups. Incorporation of nitrogen in the form of amines and imines is far more beneficial than incorporation of nitrogen by amide formation.

Core-level binding energy shifts (i.e., the N 1s spectrum from XPS analysis of treated surfaces) provide a general indication of the chemical nature of the nitrogen incorporated into the polymer surface. Higher binding energies (near the value 399.9 eV) indicate formation of amides, which are less reactive and thus not as useful for adhering gelatin-containing layers to treated supports. Lower binding energies (near the value 399.1 eV) are characteristic of amines. Because the plasma produces a distribution of nitrogen species, the centroid of the N 1s peak can be used to assess the average chemical environment of the nitrogen. Table 1 lists the N 1s centroid position as a function of treatment conditions. As can be seen from the table, the treatments at 13.6 MHz and the treatments in the floating configuration at all frequencies have the highest binding energies, and thus, the lowest degree of amine groups relative to other nitrogen-containing groups. In light of Table 1, the lower-frequency treatments on the driven electrode are seen to have not only comparable nitrogen incorporation efficiency, but also a higher efficiency for generating amines on the treated polymer surface.

Experiment 1 thus establishes that low-frequency treatments with the web on a driven electrode that is significantly smaller than its counter electrode can produce unexpectedly high efficiency of amine and imine incorporation than treatments carried out at higher frequencies. The considerably different surface chemistry obtained at 13.6 MHz as compared to that obtained at 40 kHz or 450 kHz indicates that there is a maximum frequency beyond which the surprising benefits of placing the sample on the driven smaller electrode are lost. This maximum frequency can be determined by those skilled in the art. The complications associated with power delivery and impedance matching in the high-frequency range can occur above 2 MHz. Hence the useful range of this invention can be considered to be below 2 MHz.

The lowest frequency that this invention can likely be used is determined by the charging characteristics of the polymer surface in the presence of the plasma. If the polymer surface charges quickly compared to the period of the driving voltage, the plasma may acquire a pulsed character, as the polymer surface will rapidly acquire the floating potential, thereby reducing the electric field across the cathode sheath and limiting the useful portion of the discharge cycle. Chapman (B. Chapman, Glow Discharge Processes: Sputtering and Plasma Etching, John Wiley & Sons (New York, 1980), p. 142) estimates the charging time (in seconds) as $t_c=CV/i$, where C is the capacitance of the polymer/electrode, V is the applied voltage, and i is the discharge current. The discharge current depends on geometry and plasma conditions, but is typically of the order $10^{-3}$ A/cm$^2$. For typical polyesters, the dielectric constant is roughly 3, and the capacitance C is then given by $C=3.2\times 10^{-13}/d$ (in units of F/cm$^2$), where d is the thickness of the polymer web in cm. The discharge voltage, V, depends on the electrode geometry and the discharge gas, as governed by the Paschen relation. Typical values at low frequencies, however, are roughly 1000 V. Hence, the charging time $t_c$ is expected to be roughly $3.2\times 10^{-7}/d$ seconds. Hence, for 100$\mu$ thick polyester base, the charging time is roughly 32 $\mu$s, corresponding to a lower operating frequency of roughly 30 kHz. In comparison, 10$\mu$ thick polyesters could be treated at frequencies as low as 3 kHz, and 1 mm thick polyesters would require driving frequencies above 300 kHz. As indicated above, however, the exact value of the minimum operating frequency depends on the dielectric constant of the polymer web, driving voltage, and discharge current, the latter two parameters in turn depending on geometry, gas in the discharge, and applied power. The general limitation is that the minimum driving frequency be comparable to $1/t_c$. Based on the $1/t_c$ criterion, one skilled in the art can determine a suitable lower bound of operating frequency for the polymer web and treatment apparatus used.

EXPERIMENT 2

High-Efficiency Treatments of PEN using Nitrogen Plasmas

Figure 6:
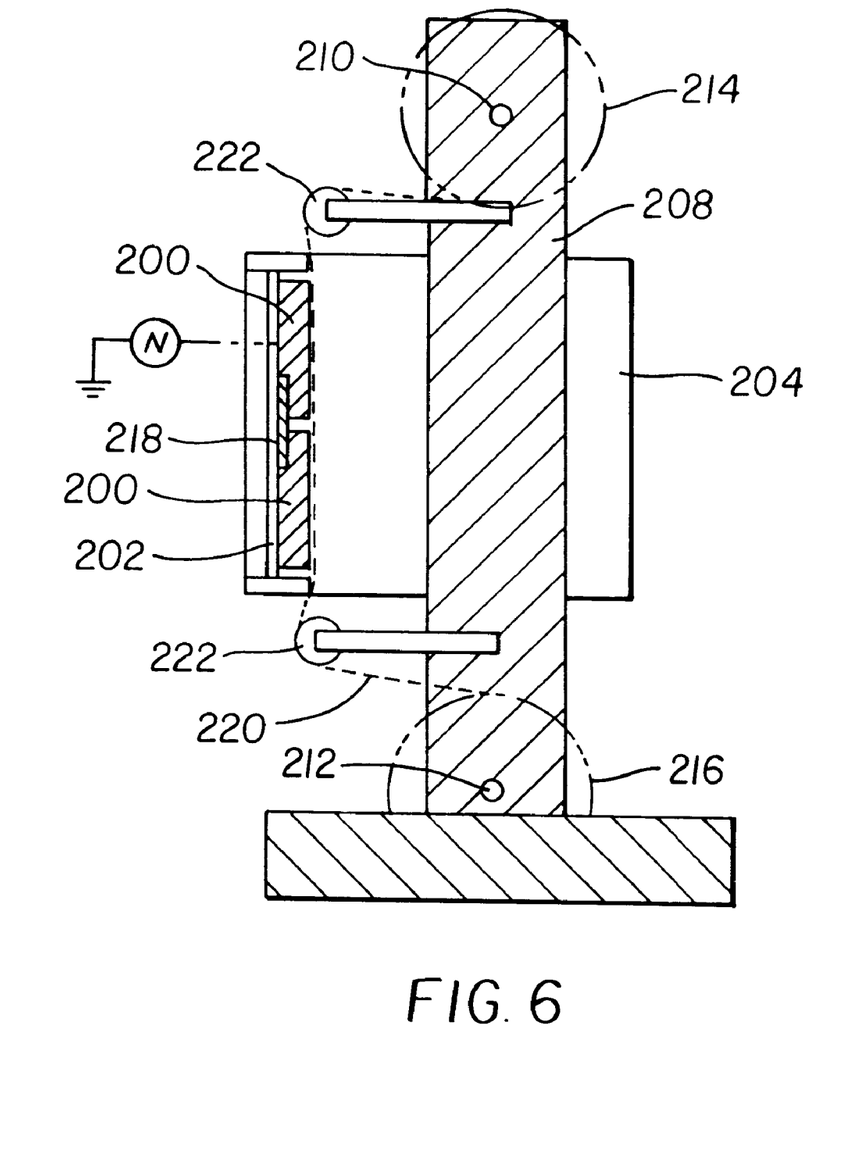
FIG. 6 is a sideview/partial sectional schematic of the configuration of the apparatus of the present invention used to conduct Experiments 2 and 3.

The benefits of carrying out plasma treatments as suggested by Experiment 1 were demonstrated in this experiment using the configuration shown in FIG. 6. Coplanar electrodes 200 and back plate 202 (identical to the coplanar electrodes 150 and backing plate 152 used in Experiment 1) were enclosed in an aluminum box 204, roughly 11.5 cm×17 cm×18 cm (height×width×depth). The box 204 was attached to a vertical support 208 and placed in the nominally 250 l chamber used in Experiment 1. This support had spindles 210, 212 located above and below the box so that a roll of material could be conveyed from the stock roll 214 (above the box) through entrance and exit slits in the box and onto a take-up roll 216 (below the box). The take-up spindle 212 was motorized; the stock roll spindle 210 had a passive friction clutch set to roughly 90 N-cm of torque. Nitrogen gas was introduced into the box 204 (via an MKS mass flow controller) through a series of pinholes drilled into gas delivery channels contained within the box walls on opposite sides (along the length of the electrode assembly).

The electrodes 200 were connected by use of thin copper straps 218 located between the electrodes and the back plate (electrically isolated from the back plate). Power was applied to the electrode assembly using an Advanced Energy PE-1000 40 kHz supply. Residence times were calculated by dividing the length of the electrode assembly (along the direction of web motion) by the conveyance speed of the web 220. Doses were calculated by taking the product of applied power and residence time, divided by the area of the electrode assembly.

Idler rollers 222 were positioned outside the box 204 behind the plane of the electrode assembly, so that the web 220 was in contact with the surface of the electrodes 200 during the treatment process. However, it should be understood that the web 220 need not touch the electrodes 200 for this invention to be effective. The distance between the electrodes 200 and the web surface must be sufficiently small that the plasma is extinguished between the electrodes 200 and the web 220. This distance depends on gas type, gas pressure, driving frequency, and applied voltage. One skilled in the art can determine an acceptable maximum web-electrode distance for a specific process. Alternatively, one may use an electrically isolated roller as a treatment electrode (FIG. 2), or one may have a surface of the web in contact with the electrode (FIG. 3), as done here.

Figure 7:
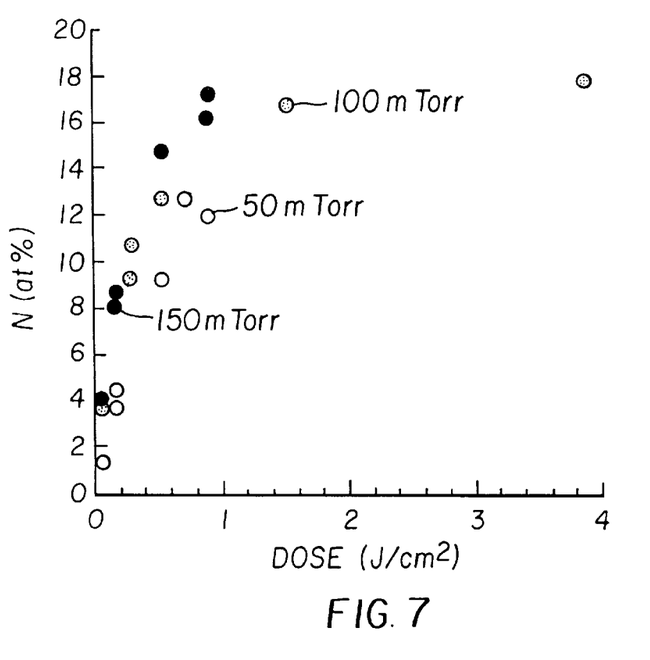
FIG. 7 is a graph plotting incorporated nitrogen as a function of high-efficiency treatment dose using the configuration of FIG. 6.
Figure 8:
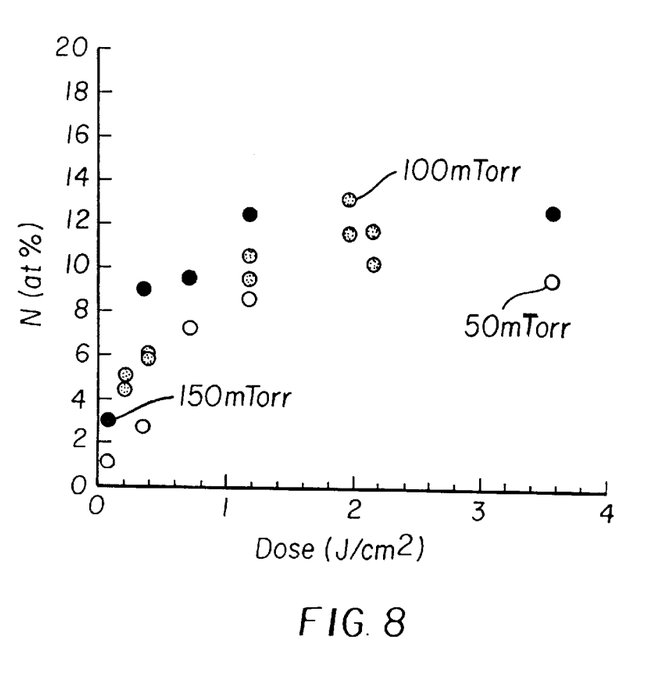
FIG. 8 is a graph plotting incorporated nitrogen as a function of floating-web treatment dose.

A series of treatments on 100$\mu$ thick poly(ethylene-2, 6-naphthalate) (PEN, manufactured by Teijin) was carried out in nitrogen by varying the applied power, web speed, and pressure. The conditions used are listed in Table 2. Treatment pressures from 50 to 150 mTorr were obtained by admitting gas at a flow of 50 to 200 std. cc/min. For comparison, floating web treatments were carried out as well. The floating web treatments were performed by conveying the PEN samples 3 cm above a pair of coplanar electrodes that were housed in an enclosure. The treatment conditions used in this configuration are listed in Table 3. Resultant nitrogen incorporation vs. dose is shown in FIGS. 7 and 8 for high-efficiency and floating configurations, respectively. By comparison of FIGS. 7 and 8, it is clear that the high efficiency configuration is more effective at incorporating nitrogen into the sample surface.

Figure 9:
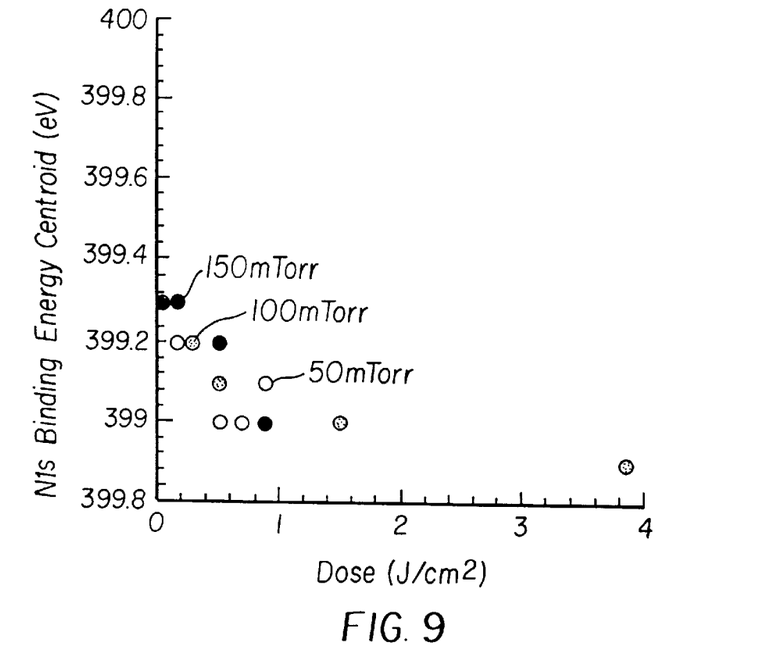
FIG. 9 is a graph plotting nitrogen 1s binding energy as a function of high-efficiency treatment dose.
Figure 10:
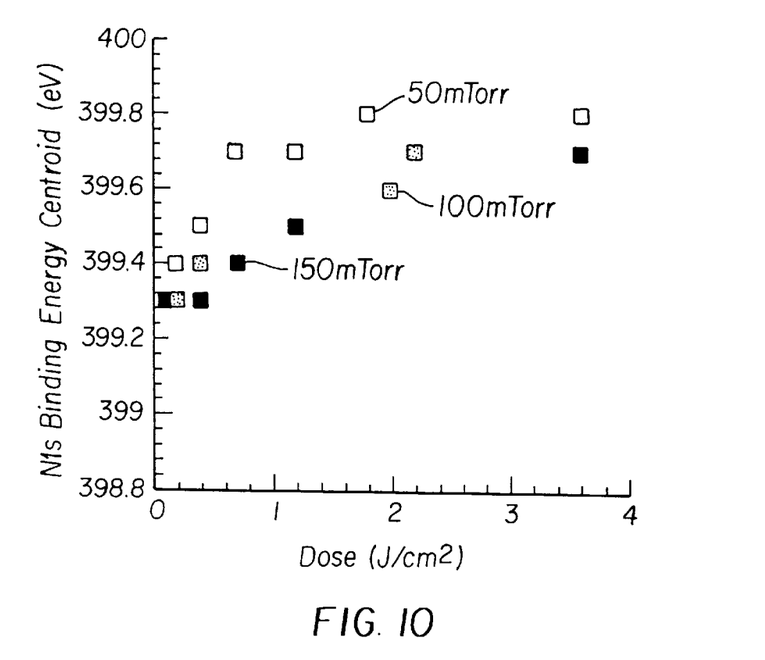
FIG. 10 is a graph plotting nitrogen 1s binding energy as a function of floating-web treatment dose.

As stated in Experiment 1, one must be concerned with the chemical nature of the nitrogen-containing groups formed on the polymer surface. The N 1s centroid gives an indication of the chemical nature of the nitrogen-containing groups. N1s centroid positions as a function of treatment dose are shown in FIG. 9 and FIG. 10, respectively for the high-efficiency configuration and for the floating web configuration. Clearly, the high-efficiency configuration produces a distribution of nitrogen-containing groups with binding energies closer to the amine values (i.e. 399.1 eV), whereas the floating web configuration produces a distribution of nitrogen-containing groups that is shifted more towards the amide region (i.e. 399.9 eV). Thus, the high-efficiency configuration produces not only more nitrogen incorporation, but also a higher proportion of amines, which are more desirable for the objectives of the present invention.

TABLE 2

Treatment conditions for nitrogen plasma treatments of PEN using the high-efficiency configuration.

| Treatment | Pressure (mTorr) | Power (Watts) | Residence Time (Sec.) | Dose (J/cm$^2$) |
|---|---|---|---|---|
| HEN-1 | 50 | 60 | 1.5 | 0.54 |
| HEN-2 | 50 | 60 | 0.5 | 0.18 |
| HEN-3 | 50 | 100 | 1.5 | 0.89 |
| HEN-4 | 50 | 20 | 1.5 | 0.18 |
| HEN-5 | 50 | 60 | 2.55 | 0.91 |
| HEN-6 | 50 | 20 | 0.5 | 0.06 |
| HEN-7 | 100 | 60 | 1.5 | 0.54 |
| HEN-8 | 100 | 100 | 0.5 | 0.30 |
| HEN-9 | 100 | 20 | 0.5 | 0.06 |
| HEN-10 | 100 | 100 | 2.55 | 1.5 |
| HEN-11 | 100 | 20 | 2.55 | 0.30 |
| HEN-12 | 100 | 100 | 6.5 | 3.87 |
| HEN-13 | 150 | 60 | 1.5 | 0.54 |
| HEN-14 | 150 | 60 | 0.5 | 0.18 |
| HEN-15 | 150 | 100 | 1.5 | 0.89 |
| HEN-16 | 150 | 20 | 1.5 | 0.18 |
| HEN-17 | 150 | 60 | 2.55 | 0.91 |
| HEN-18 | 150 | 20 | 0.5 | 0.06 |

TABLE 3

Treatment conditions for nitrogen plasma treatments of PEN using the floating-web configuration.

| Treatment | Pressure (mTorr) | Power (Watts) | Residence Time (Sec.) | Dose (J/cm$^2$) |
|---|---|---|---|---|
| FLN-1 | 50 | 60 | 3 | 0.36 |
| FLN-2 | 50 | 600 | 3 | 3.6 |
| FLN-3 | 50 | 330 | 1.8 | 1.2 |
| FLN-4 | 50 | 600 | 0.6 | 0.72 |
| FLN-5 | 50 | 60 | 0.6 | 0.072 |
| FLN-6 | 100 | 330 | 3 | 2.0 |
| FLN-7 | 100 | 60 | 1.8 | 0.22 |
| FLN-8 | 100 | 600 | 1.8 | 2.2 |
| FLN-9 | 100 | 330 | 1.8 | 1.2 |
| FLN-10 | 100 | 330 | 0.6 | 0.39 |
| FLN-11 | 150 | 60 | 3 | 0.36 |
| FLN-12 | 150 | 600 | 3 | 3.6 |
| FLN-13 | 150 | 330 | 1.8 | 1.2 |
| FLN-14 | 150 | 600 | 0.6 | 0.72 |
| FLN-15 | 150 | 60 | 0.6 | 0.072 |

EXPERIMENT 3

High-Efficiency Treatments of PEN using Oxygen Plasmas

A series of treatments on poly(ethylene napththalate) (PEN) was carried out in oxygen by varying the applied power, web speed, and pressure. The conditions used are listed in Tables 4 and 5. The high-efficiency treatments were made using the same apparatus as used in Experiment 2 (see FIG. 6). The floating-web treatments were performed by suspending the PEN samples 3 cm above a pair of coplanar electrodes housed in an enclosure (as described in Experiment 2).

As mentioned above in the discussion of Experiment 1, assessment of the ester rearrangement was done by examination of the XPS O 1s spectrum. For oxygen plasma treated PEN, the O 1s spectrum exhibits changes very different from those observed for nitrogen plasma treatment. At low doses, the characteristic ester doublet exhibits a significant increase in intensity in the region of oxygen singly bonded to carbon (~533.5 eV). This change is consistent with the C 1s spectrum at low dose and suggests the formation of primarily hydroxyl, ether, and epoxy species lo at low dose. As the dose is increased, the O 1s band centroid shifts to lower binding energy and the band shape becomes more symmetrical. Thus, at higher doses, the spectra suggest the formation of more carbonyl and carboxyl species relative to hydroxyl, ether, and epoxy species, consistent with analysis of the C 1s spectra.

To quantify the ester rearrangement on oxygen-plasma-treated PEN, the O 1s spectra for all the treatments were overlaid and rank ordered from the lowest rearrangement (closest to the characteristic ester doublet) to the highest rearrangement (closest to a symmetrical band shifted toward lower binding energy). This ranking is then refined to reflect the degree of change from one value to the next. This procedure was applied to samples FLO1–FLO15 listed below, and ester rearrangement from all other oxygen plasma treatments was assessed by comparison with the results from samples FLO1–FLO15. The resultant scale of ester rearrangement is from 0 (no effect of treatment) to 7 (maximum affect seen in samples FLO1–FLO15). Because ester rearrangement occurs concurrently with oxygen incorporation for oxygen plasma treatment, the rearrangement value assigned is indicative of not only ester rearrangement, but also incorporation of oxygen into the treated surface.

As disclosed in Grace et al. (U.S. Pat. No. 5,538,841) rearrangement of the ester group into carbonyl and carboxyl species is a desirable effect of oxygen plasma treatment of polyester supports. The chemical benefit of the ester rearrangement was further illustrated by coating oxygen-plasma treated PEN with a representative photographic emulsion and testing for adhesion in the presence of photographic developer solution. The bottom layer of Kodacolor Gold™ film was coated as a representative photographic emulsion. The adhesion test was carried out by soaking samples in Flexicolor™ (C-41) developer at 100 C for 3:15. The samples were then placed in a developer-filled tray, and a weighted 35 mm dia. Scotchbrite™ pad was rubbed back and forth along the sample surface (roughly 3 cm stroke) for 30 cycles in roughly sec. The applied weight was 400 g. Samples were rinsed in water and dried. The amount of coating removed in the rubbed area was assessed by use of an optical scanner (Logitech ScanMan), and adhesion failure results were reported as % removed.

Figure 11:
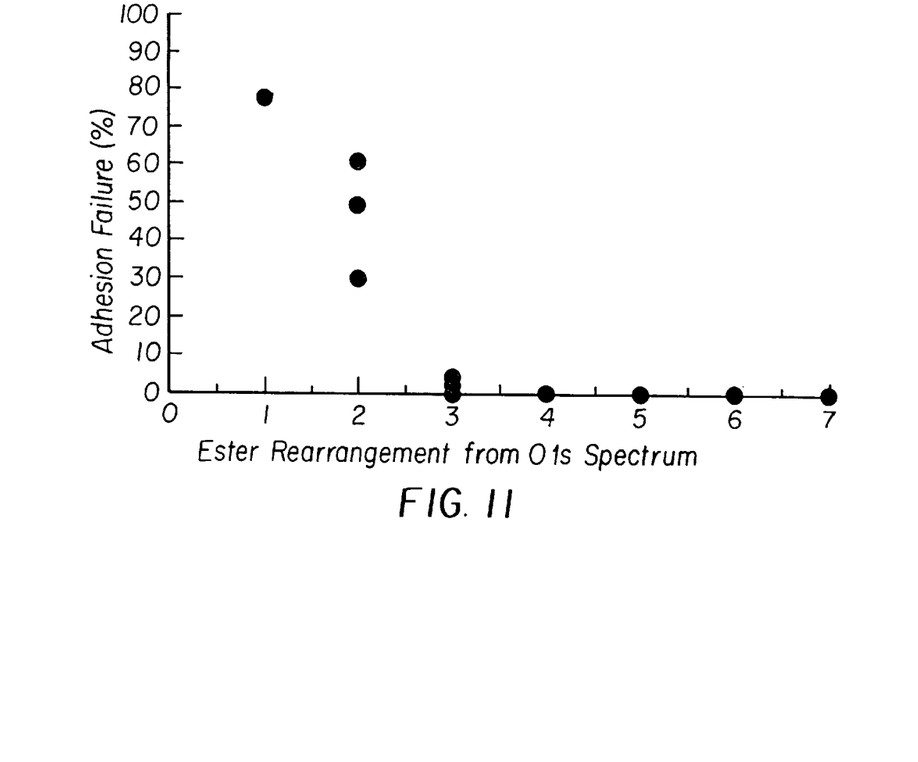
FIG. 11 is a graph plotting adhesion failure as a function of ester rearrangements resulting from oxygen plasma treatment of PEN using the floating-web configuration.
Figure 12:
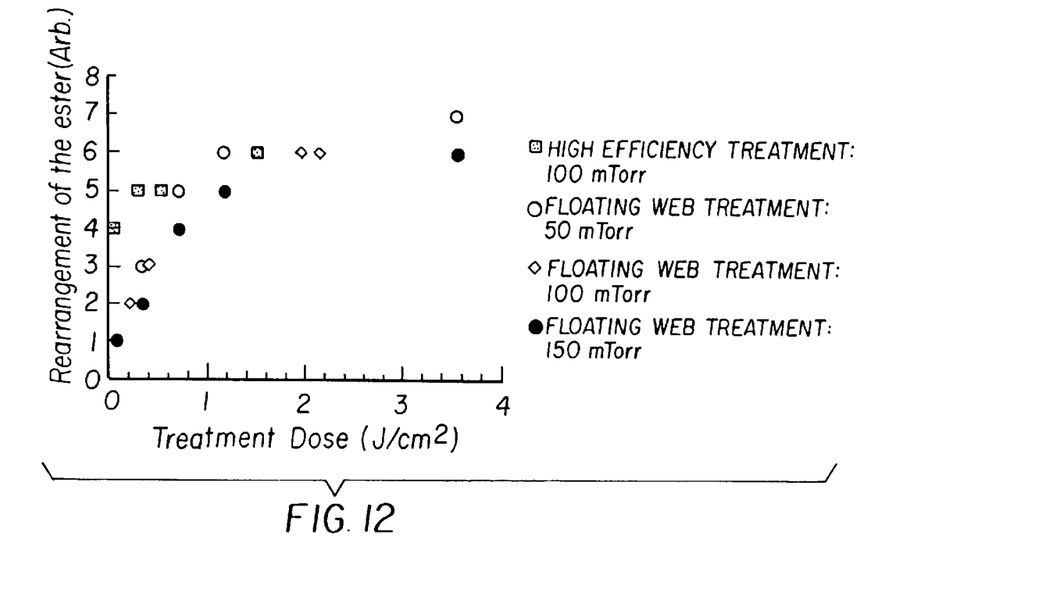
FIG. 12 is a graph plotting comparison of ester rearrangements resulting from oxygen plasma treatment of PEN in the floating-web and high-efficiency configurations.
Figure 13:
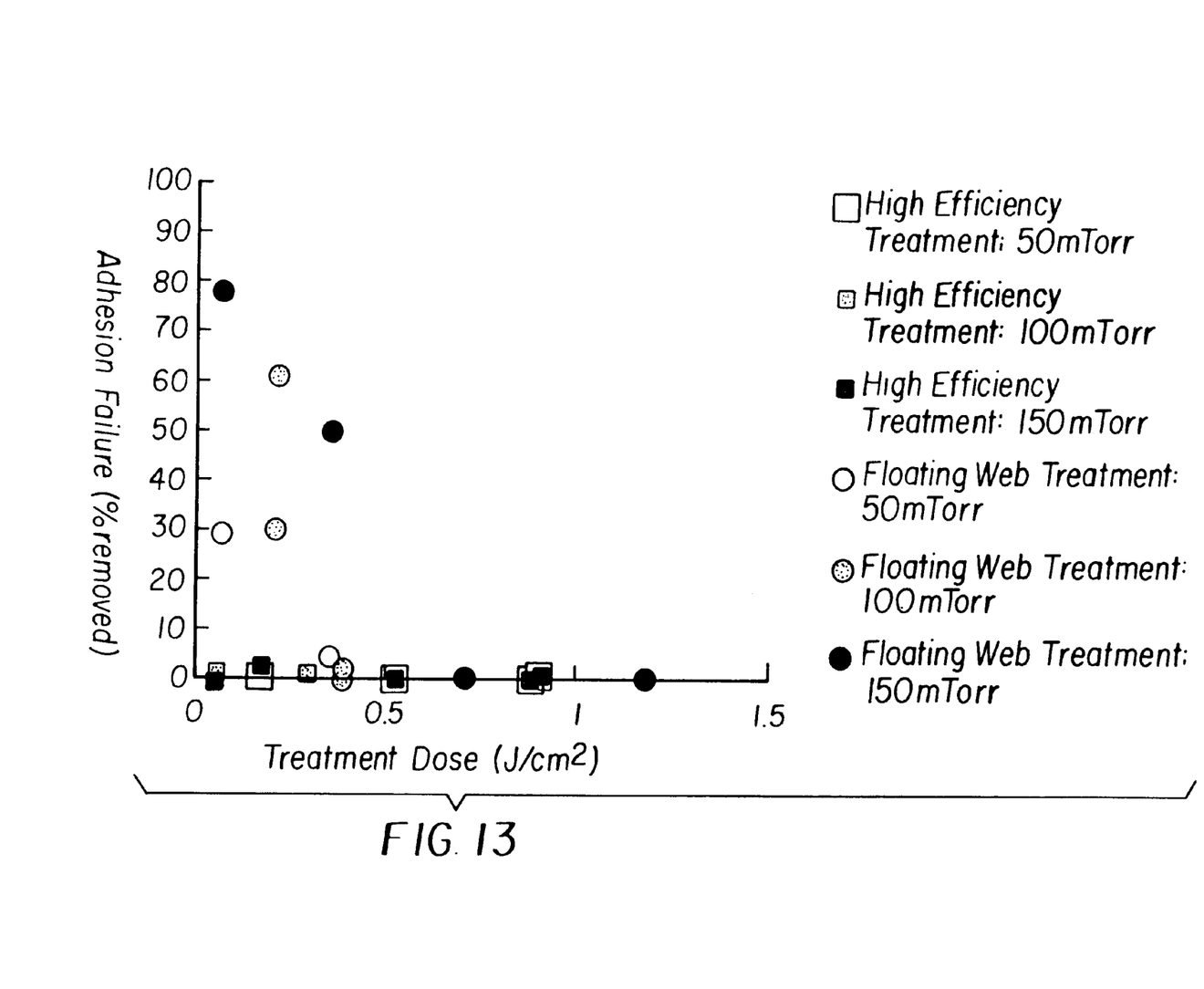
FIG. 13 is a graph plotting comparison of adhesion failure as a function of dose for oxygen plasma treatments using the floating-web and high-efficiency configurations.

Adhesion failure as a function of ester rearrangement for treatments in the floating web configuration is shown in FIG. 11. From the graph it can be seen that ester rearrangements below a value of 3 result in adhesion loss. The dependence of the ester rearrangement on treatment dose is shown in FIG. 12. By examination of FIG. 12, it is clear that the high efficiency configuration is more effective at producing the desirable chemical rearrangement of the ester group. It is furthermore shown in FIG. 13 that the high-energy configuration provides good adhesion at significantly lower doses than required in the floating web configuration. As can be seen in FIG. 13, all the treatments performed using the high-efficiency configuration have little or no adhesion failure, even for doses as low as 0.06 J/cm2. In contrast, the lower-dose treatments (0.36 J/cm$^2$ and below) using the floating web configuration exhibit appreciable adhesion failure. Thus, the high-efficiency treatment configuration reduces the required treatment dose by at least a factor of six. It is quite probable that the improvement is even more than shown here, as none of the low-dose treatments in the high-efficiency configuration showed any signs of insufficient adhesion.

TABLE 4

Treatment conditions for nitrogen plasma treatments of PEN using the floating-web configuration.

| Treatment | Pressure (mTorr) | Power (Watts) | Residence Time (Sec.) | Dose (J/cm$^2$) |
|---|---|---|---|---|
| FLO-1 | 50 | 60 | 3 | 0.36 |
| FLO-2 | 50 | 600 | 3 | 3.6 |
| FLO-3 | 50 | 330 | 1.8 | 1.2 |
| FLO-4 | 50 | 600 | 0.6 | 0.72 |
| FLO-5 | 50 | 60 | 0.6 | 0.072 |
| FLO-6 | 100 | 330 | 3 | 2.0 |
| FLO-7 | 100 | 60 | 1.8 | 0.22 |
| FLO-8 | 100 | 600 | 1.8 | 2.2 |
| FLO-9 | 100 | 330 | 1.8 | 1.2 |
| FLO-10 | 100 | 330 | 0.6 | 0.39 |
| FLO-11 | 150 | 60 | 3 | 0.36 |
| FLO-12 | 150 | 600 | 3 | 3.6 |
| FLO-13 | 150 | 330 | 1.8 | 1.2 |
| FLO-14 | 150 | 600 | 0.6 | 0.72 |
| FLO-15 | 150 | 60 | 0.6 | 0.072 |

TABLE 5

Treatment conditions for nitrogen plasma treatments of PEN using the high-efficiency configuration.

| Treatment | Pressure (mTorr) | Power (Watts) | Residence Time (Sec.) | Dose (J/cm$^2$) |
|---|---|---|---|---|
| HEO-1 | 50 | 60 | 1.5 | 0.54 |
| HEO-2 | 50 | 60 | 0.5 | 0.18 |
| HEO-3 | 50 | 100 | 1.5 | 0.89 |
| HEO-4 | 50 | 20 | 1.5 | 0.18 |
| HEO-5 | 50 | 60 | 2.55 | 0.91 |
| HEO-6 | 50 | 20 | 0.5 | 0.06 |
| HEO-7 | 100 | 60 | 1.5 | 0.54 |
| HEO-8 | 100 | 100 | 0.5 | 0.30 |
| HEO-9 | 100 | 20 | 0.5 | 0.06 |
| HEO-10 | 100 | 100 | 2.55 | 1.5 |
| HEO-11 | 100 | 20 | 2.55 | 0.30 |
| HEO-12 | 150 | 60 | 1.5 | 0.54 |
| HEO-13 | 150 | 60 | 0.5 | 0.18 |
| HEO-14 | 150 | 100 | 1.5 | 0.89 |
| HEO-15 | 150 | 20 | 1.5 | 0.18 |
| HEO-16 | 150 | 60 | 2.55 | 0.91 |
| HEO-17 | 150 | 20 | 0.5 | 0.06 |

Although the treatment electrodes 16, 52, 104 have been described herein as being the driven electrodes, it should be understood that the method and apparatus of the present invention can also be practiced by driving the second electrodes 26, 64, 114 and grounding the treatment electrodes 16, 52, 104. The treatment electrodes 16, 52, 104 remain the treatment electrodes and have a surface area in the treatment zone which is not greater than the surface area of the counter electrode. Further, the treatment configurations as depicted in the FIGS. 1 through 3 remain the same with the exception that the second electrodes 26, 64, 114 becomes the driven electrodes.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

What is claimed is:

1. An apparatus for treating polymer web materials with a plasma, said apparatus comprising:

(a) a dark space generated by a treatment electrode in a treatment zone;

(b) a counter electrode, said treatment electrode having a surface area in said treatment zone which is not greater than a surface area of said counter electrode; and (c) a power supply for driving said treatment electrode with an oscillating high voltage at a frequency less than about 2 MHz and greater than $1/t_c$ where $t_c$ is the charging time of a web surface exposed to a rms ion current in the plasma.

2. An apparatus as recited in claim 1 wherein:
said treatment electrode is a stationary electrode.

3. An apparatus as recited in claim 1 wherein:
said treatment electrode is a rotatable electrode.

4. An apparatus as recited in claim 1 wherein:

said counter electrode also serves to confine the plasma and define the treatment zone.

5. An apparatus as recited in claim 2 wherein:

said counter electrode also serves to confine the plasma and define the treatment zone.

6. An apparatus as recited in claim 3 wherein:

said counter electrode also serves to confine the plasma and define the treatment zone.

7. An apparatus as recited in claim 3 wherein:

said treatment electrode includes a contact surface, the web being in contact with said contact surface in said treatment zone.

8. An apparatus as recited in claim 1 wherein:

said treatment electrode includes a contact surface, the web being in contact with said contact surface in said treatment zone.

9. A method for treating polymer web materials with a plasma comprising the steps of:

(a) supplying a treatment gas to a treatment zone;

(b) driving a treatment electrode with an oscillating high voltage at a frequency less than about 2 MHz and greater than $1/t_c$ where $t_c$ is the charging time of a web surface exposed to a rms ion current in the plasma, the treatment electrode having a surface area in the treatment zone which is not greater than a surface area of a counter electrode;

(c) generating a plasma in the treatment zone with the treatment electrode; and (d) conveying a polymer web material through the treatment zone.

10. A method for treating polymer web materials as recited in claim 9 wherein:

the polymer web material receives a treatment dose of less than 0.5 J/cm$^2$.

11. A method for treating polymer web materials as recited in claim 10 further comprising the step of:

subsequently coating the polymer web material with a non-photosensitive layer.

12. A method for treating polymer web materials as recited in claim 10 wherein:

the treatment gas is nitrogen and the non-photosensitive layer is reactive with amines or imines.

13. A method for treating polymer web materials as recited in claim 10 wherein:

the treatment gas is oxygen and the non-photosensitive layer is reactive with ether, hydroxyl, epoxy, carbonyl or carboxyl groups.

14. A method for treating polymer web materials as recited in claim 10 further comprising the step of:

subsequently coating the polymer web material with a photosensitive layer.

15. A method as recited in claim 9 wherein:

the polymer web material is polyester.

16. A method as recited in claim 9 wherein:

the polymer web material is PET.

17. A method as recited in claim 9 wherein:

the polymer web material is PEN.

18. An apparatus for treating polymer web materials with a plasma, said apparatus comprising:

(a) a dark space generated by a treatment electrode in a treatment zone;

(b) a counter electrode, said treatment electrode having a surface area in said treatment zone which is not greater than a surface area of said counter electrode; and (c) a power supply for driving either said treatment electrode or said counter electrode with an oscillating high voltage at a frequency less than about 2 MHz and greater than $1/t_c$ where $t_c$ is the charging time of a web surface exposed to a rms ion current in the plasma.

19. An apparatus as recited in claim 18 wherein:

said treatment electrode is a stationary electrode.

20. An apparatus as recited in claim 18 wherein:

said treatment electrode is a rotatable electrode.

21. An apparatus as recited in claim 18 wherein:

said counter electrode also serves to confine the plasma and define the treatment zone.

22. An apparatus as recited in claim 19 wherein:

said counter electrode also serves to confine the plasma and define the treatment zone.

23. An apparatus as recited in claim 20 wherein:

said counter electrode also serves to confine the plasma and define the treatment zone.

24. An apparatus as recited in claim 20 wherein:

said treatment electrode includes a contact surface, the web being in contact with said contact surface in said treatment zone.

25. An apparatus as recited in claim 18 wherein:

said treatment electrode includes a contact surface, the web being in contact with said contact surface in said treatment zone.

* * * * *